(12) United States Patent
Ito et al.

(10) Patent No.: US 11,485,212 B2
(45) Date of Patent: Nov. 1, 2022

(54) ELECTRIC WORK VEHICLE

(71) Applicant: Kubota Corporation, Osaka (JP)

(72) Inventors: Hirokazu Ito, Sakai (JP); Junichi Yamanaka, Sakai (JP); Kazuaki Matsuda, Sakai (JP)

(73) Assignee: Kubota Corporation, Osaka (JP)

( * ) Notice: Subject to any disclaimer, the term of this patent is extended or adjusted under 35 U.S.C. 154(b) by 211 days.

(21) Appl. No.: 16/898,037

(22) Filed: Jun. 10, 2020

(65) Prior Publication Data

US 2021/0101462 A1    Apr. 8, 2021

(30) Foreign Application Priority Data

Oct. 8, 2019 (JP) .............................. JP2019-185166

(51) Int. Cl.
| | | |
|---|---|---|
| *B60K 1/00* | (2006.01) | |
| *B60K 1/04* | (2019.01) | |
| *A01D 34/78* | (2006.01) | |
| *A01D 69/02* | (2006.01) | |
| *B60K 26/02* | (2006.01) | |
| *B60N 2/04* | (2006.01) | |
| *B60R 16/02* | (2006.01) | |
| *H01R 13/629* | (2006.01) | |
| *B60L 50/60* | (2019.01) | |
| *B60L 50/64* | (2019.01) | |
| *B60L 53/80* | (2019.01) | |

(Continued)

(52) U.S. Cl.
CPC ................ *B60K 1/04* (2013.01); *A01D 34/78* (2013.01); *A01D 69/02* (2013.01); *B60K 26/02* (2013.01); *B60L 50/60* (2019.02); *B60L 50/64* (2019.02); *B60N 2/04* (2013.01); *B60R 16/0207* (2013.01); *H01R 13/62961* (2013.01); *A01D 34/64* (2013.01); *A01D 2101/00* (2013.01); *B60L 53/80* (2019.02); *H01R 2201/26* (2013.01)

(58) Field of Classification Search
CPC .. B60K 1/04; B60K 1/02; B60K 26/02; B60L 50/66; B60L 50/60; B60L 50/64
See application file for complete search history.

(56) References Cited

U.S. PATENT DOCUMENTS 5,360,307 A * 11/1994 Schemm .................. B62B 3/10
                                                          180/68.5
6,357,070 B1 * 3/2002 Venard .................... B60L 50/66
                                                          180/68.5

(Continued)

FOREIGN PATENT DOCUMENTS

| CA | 2242337 A1 | 8/1997 |
| DE | 102004047339 A1 | 3/2006 |

(Continued)

*Primary Examiner* — Hau V Phan
(74) *Attorney, Agent, or Firm* — The Webb Law Firm

(57) ABSTRACT

In an electric work vehicle, a power feeding assembly which connects a battery device to a power controller unit so as to feed power includes a fixed connector which is fixed to the battery device and electrically connected to the battery device, a cable harness connected to a power controller unit, and a free connector which is connected to an end of the cable harness and connectable to a fixed connector, and a connecting operation tool is configured to be movable the free connector between the connecting position in which the free connector is connected to the fixed connector and the detaching position.

6 Claims, 7 Drawing Sheets

(51) Int. Cl.
    *A01D 34/64* (2006.01)
    *A01D 101/00* (2006.01)

(56) References Cited

U.S. PATENT DOCUMENTS

| | | | | |
|---|---|---|---|---|
| 6,662,881 | B2* | 12/2003 | Domann | E02F 9/2275 |
| | | | | 172/272 |
| 6,732,825 | B2* | 5/2004 | Takeda | B60R 16/04 |
| | | | | 280/783 |
| 7,712,563 | B2* | 5/2010 | Niebuhr | B60L 53/80 |
| | | | | 180/311 |
| 8,653,786 | B2* | 2/2014 | Baetica | B60L 50/66 |
| | | | | 56/11.9 |
| 8,905,170 | B2* | 12/2014 | Kyoden | B62J 43/28 |
| | | | | 180/68.5 |
| 9,550,659 | B2* | 1/2017 | Nakazawa | B60K 1/00 |
| 9,850,114 | B2* | 12/2017 | Gilland | B66F 9/0754 |
| 10,029,551 | B2* | 7/2018 | Ito | A01D 34/82 |
| 11,102,928 | B2* | 8/2021 | Uemura | B60K 1/04 |
| 2007/0193798 | A1* | 8/2007 | Allard | G05B 19/414 |
| | | | | 180/169 |
| 2012/0103684 | A1* | 5/2012 | Maguire | H01R 11/284 |
| | | | | 174/72 A |
| 2013/0025950 | A1* | 1/2013 | Brandon | B60K 1/04 |
| | | | | 180/65.1 |
| 2014/0102065 | A1 | 4/2014 | Moriguchi et al. | |
| 2017/0263914 | A1* | 9/2017 | Ito | B60K 1/02 |
| 2019/0014718 | A1 | 1/2019 | Uemura et al. | |

FOREIGN PATENT DOCUMENTS

| | | |
|---|---|---|
| JP | 201973148 A | 5/2019 |
| WO | 9728016 A1 | 8/1997 |
| WO | 2012176350 A1 | 12/2012 |

* cited by examiner

ELECTRIC WORK VEHICLE

CROSS-REFERENCE TO RELATED APPLICATION

This application claims priority to Japanese Patent Application No. 2019-185166 filed Oct. 8, 2019, the disclosure of which is hereby incorporated by reference in its entirety.

TECHNICAL FILED

The present invention relates to an electric work vehicle having a battery device which is detachably housed in a battery housing part provided in a vehicle body.

BACKGROUND ART

An electric work vehicle according to Patent Literature 1 travels with power fed from a battery which is detachably housed in a battery housing part provided on a vehicle body. A power feed line from the battery includes a power feeding coupler composed of a first connector provided on a vehicle body-side and a second connector provided on a battery-side. On the vehicle body-side, there is provided an operation tool which moves the battery and the second connector so that a pre-attachment posture in which the first connector and the second connector face each other is shifted to an attachment posture in which the first connector is connected to the second connector. On the vehicle body-side, there is also provided a connecting body which connects the operation tool and the battery.

CITATION LIST

Patent Literature

[Patent Literature 1] Japanese Patent Application Publication No. 2019-73148

SUMMARY OF INVENTION

Technical Problem

In the electric work vehicle according to Patent Literature 1, when the power feeding coupler is connected, a large operating force needs to be given to the operation tool, because the battery is also moved. When a long operating lever is used for reducing the operating force in connecting the connectors, a large operating space is needed around a battery housing part. Since a relatively large space for cooling is secured on an upper side of the battery, it is advantageous to provide the operation tool in the battery. In Patent Literature 1, there is a description that the operating lever and the connectors may be attached on the battery-side, but a specific attaching configuration is not disclosed.

In view of such actual circumstances, there has been a demand for a rational configuration in which a need for moving the battery in connecting the connectors is eliminated, and the connecting tool for connecting the connector on the vehicle-side and the connector on the battery-side is fixed to the battery-side.

Solution to Problem

An electric work vehicle according to the present invention includes: a battery device which is detachably housed in a battery housing part provided in a vehicle body; a power controller unit provided in the vehicle body; a power feeding assembly which connects the battery device to the power controller unit so as to feed power; and a connecting operation tool attached to the battery device;

wherein the power feeding assembly comprises a fixed connector which is fixed to the battery device and electrically connected to the battery device, a cable harness which is electrically connected to the power controller unit, and a free connector which is provided at an end of the cable harness and connectable to the fixed connector, and the connecting operation tool is configured to be movable between a connecting position in which the free connector is connected to the fixed connector and a detaching position in which the free connector is detached from the fixed connector.

In this configuration, the connector on a battery-side is the fixed connector which is fixed to the battery device, and the connector on a vehicle-side, which is a connector on a power controller unit-side, is the free connector provided at an end of the cable harness which is electrically connected to the power controller unit. Therefore, the free connector can move freely within an allowable range constrained by the cable harness. After the battery device is housed in the battery housing part, at an initial stage for connecting the fixed connector to the free connector, the free connector is set in the connecting operation tool at the detaching position so that the free connector faces the fixed connector. At a next stage, the free connector is inserted into the fixed connector along with a movement of the connecting operation tool from the detaching position to the connecting position. Since the connecting operation tool is attached to an upper face of the battery device in which a space is secured thereabove, a space needed for connecting operation of the connecting operation tool is easily secured. Also, the movement of the connecting operation tool from the detaching position to the connecting position is not accompanied by a movement of the battery, the connectors can be connected only with a small operating force.

In a preferred embodiment of the present invention, the connecting operation tool includes a pin which push the free connector to the fixed connector during the movement from the detaching position to the connecting position. The free connector is moved to the fixed connector smoothly by being pushed by the pin.

The connection of the fixed connector with the free connector is disengaged with a movement of the connecting operation tool to the detaching position. The free connector released from the connecting operation tool is constrained by a length of the cable harness, but is brought into a substantially free state. In such a state, when the battery device is disconnected from the battery housing part and away from the vehicle body for charging or the like, the free connector possibly hangs downward and swings. To avoid damage of the free connector by such an unexpected movement, it is needed to immobilize the free connector released from the connecting operation tool. For this reason, in a preferred embodiment of the present invention, the power controller unit is provided with a socket to which the free connector released from the connecting operation tool at the detaching position is inserted. With this configuration, the free connector released by the connecting operation tool is inserted into the socket while bending the cable harness, and is brought to a static state.

The free connector can be kept in a static state by being inserted into the socket. However, when the cable harness is long, a middle part of the cable harness possibly moves in accordance with a movement of the vehicle body. To avoid this, in a preferred embodiment of the present invention, the power controller unit is provided with a holding tool for fixing the middle part of the cable harness to the power controller unit, and at least a partial section of the cable harness from the middle part to the free connector is flexible. With this configuration, since the middle part of the cable harness is fixed by the holding tool, the movement of the cable harness is constrained. Also, since at least a partial section of the cable harness from the middle part to the free connector is flexible, a degree of freedom needed to connect the free connector to the fixed connector is sufficiently secured.

In a preferred embodiment of the present invention, a seat cushion of a driver's seat which is movable forward with a seat back is arranged above the power controller unit, and the cable harness and the free connector detached from the connecting operation tool are arranged in a space between the seat cushion and an upper face of the power controller unit. With this configuration, since the cable harness is housed between the seat cushion and the power controller unit, interference of the cable harness with other members or a driver is avoided. Also, when the connection with the fixed connector is disengaged, interference with other members or the driver is avoided because the free connector is also housed between the seat cushion and the power controller unit.

DESCRIPTION OF EMBODIMENTS

Unless otherwise specified, the term "front" means forward with respect to the front-rear direction of a vehicle body (traveling direction), and "rear" means rearward with respect to the front-rear direction of the vehicle body (traveling direction) herein. Further, the right-left direction or the lateral direction means the transverse direction of the vehicle body (vehicle body width direction) orthogonal to the front-rear direction of the vehicle body. "Upper" or "lower" is a positional relation with the vertical direction (perpendicular direction) of the vehicle body and means a relation to height above ground level.

Figure 1:
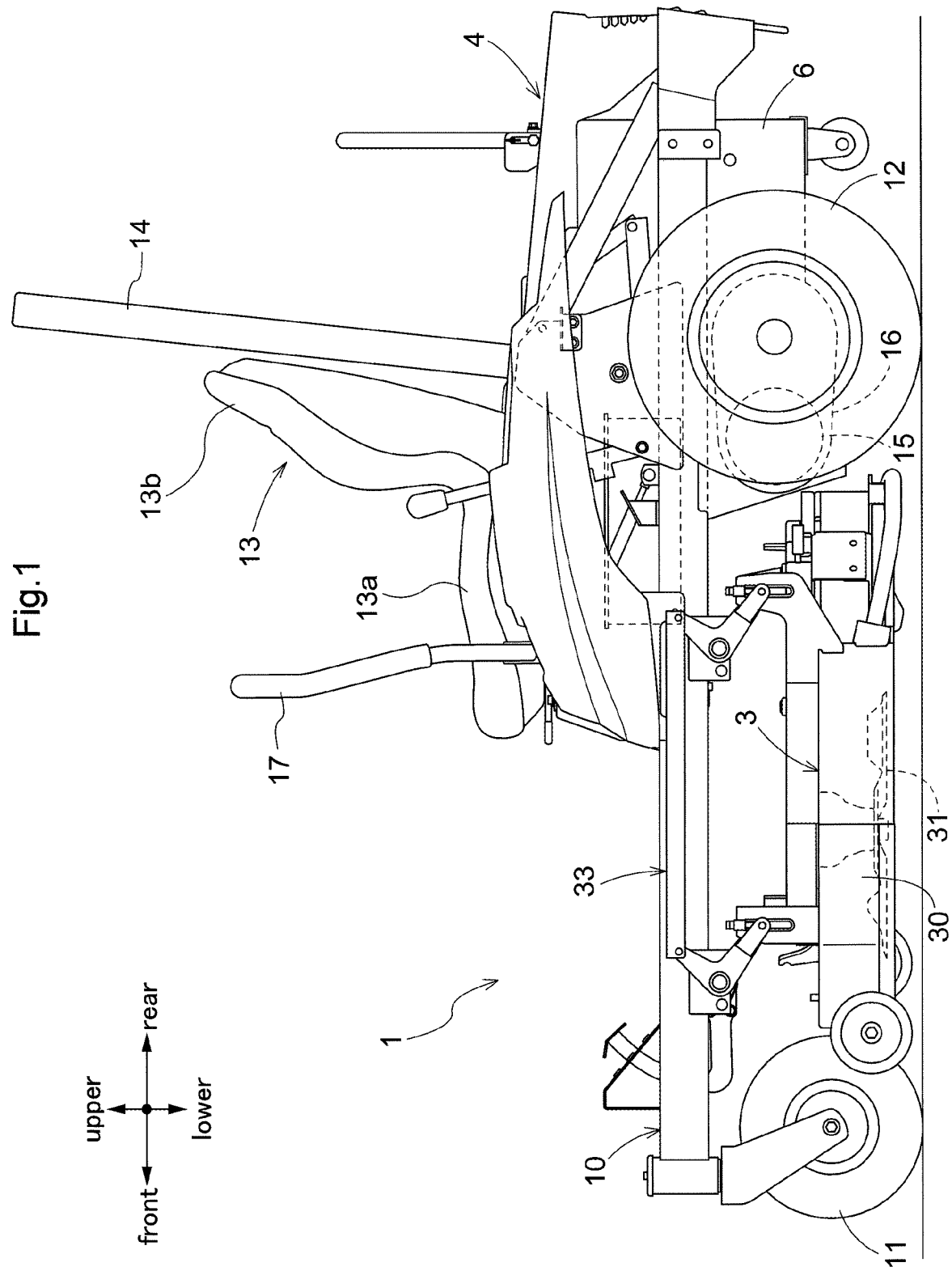
FIG. 1 is an overall side view of an electric mower as an example of an electric work vehicle.
Figure 2:
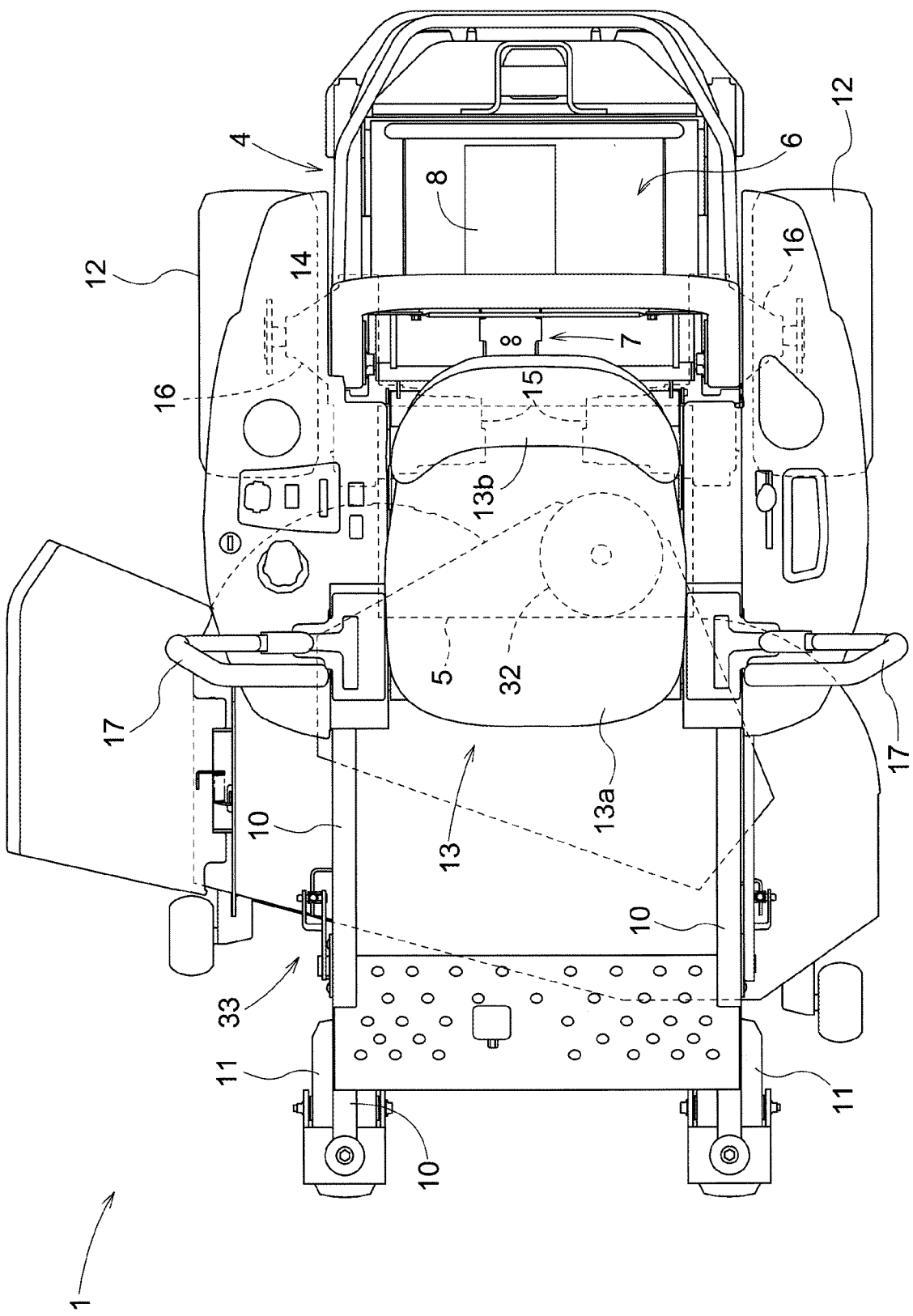
FIG. 2 is an overall plane view of an electric mower.

In the following, an embodiment of the electric work vehicle according to the present invention will be described. The work vehicle is an electric mower herein. As shown in FIG. 1 and FIG. 2, the electric mower includes a pair of right and left front wheels 11 supported by a front part of a vehicle body 1, a pair of right and left rear wheels 12 supported by a rear part of the vehicle body 1, and a mower unit 3 supported between the front wheels 11 and the rear wheels 12 in a lower part of the vehicle body 1. A battery housing part 4 is provided between the right and left rear wheels 12. Further, a driver's seat 13, a ROPS frame 14, and the like are provided in the vehicle body 1.

The vehicle body 1 includes a frame 10 composed of right and left longitudinal beams extending in the front-rear direction, and cross beams linking the longitudinal beams. The driver's seat 13 has a seat cushion 13a and a sear back 13b, and is supported by the frame 10 so as to be pivotally move around a horizontal axis between a first swinging posture in which a driver is allowed to sit and a second swinging posture in which the seat back 13b moves forward. A lower end of the ROPS frame 14 is connected to the frame 10.

The front wheels 11 are caster-type wheels, and the rear wheels 12 are driving wheels. A pair of right and left travel motors 15 and speed-reduction mechanisms 16 are arranged on inner sides of the respective rear wheels 12. Power of the travel motor 15 is transmitted to the rear wheel 12 via the speed-reduction mechanism 16. The rear wheels 12 are driven independently.

Shift levers 17 are arranged on respective lateral sides of the driver's seat 13. When the right shift lever 17 is operated to a neutral position, the right travel motor 15 is brought into a stop state. When the right shift lever 17 is operated to a forward movement side, the right travel motor 15 rotates in a direction to move the vehicle forward. When the right shift lever 17 is operated to a rearward movement side, the right travel motor 15 rotates in a direction to move the vehicle rearward. Similarly, when the left shift lever 17 is operated to a neutral position, forward movement side, and a rearward movement side, the left travel motor 15 operates in the same manner as the above. With the operation of the left and right shift levers 17, the left and right rear wheels 12 are driven to a direction to move the vehicle forward or a direction to move the vehicle rearward independently from each other, and the vehicle body 1 is moved forward or rearward, and is turned right or left.

A mower unit 3 includes a mower deck 30 and a cutting blade 31 which is supported rotatably about a vertical axis inside the mower deck 30. The cutting blade 31 is rotatably driven by a cutting blade motor 32 (refer to FIG. 2). The mower deck 30 is elevatably suspended from the frame 10 by a link mechanism 33.

Figure 3:
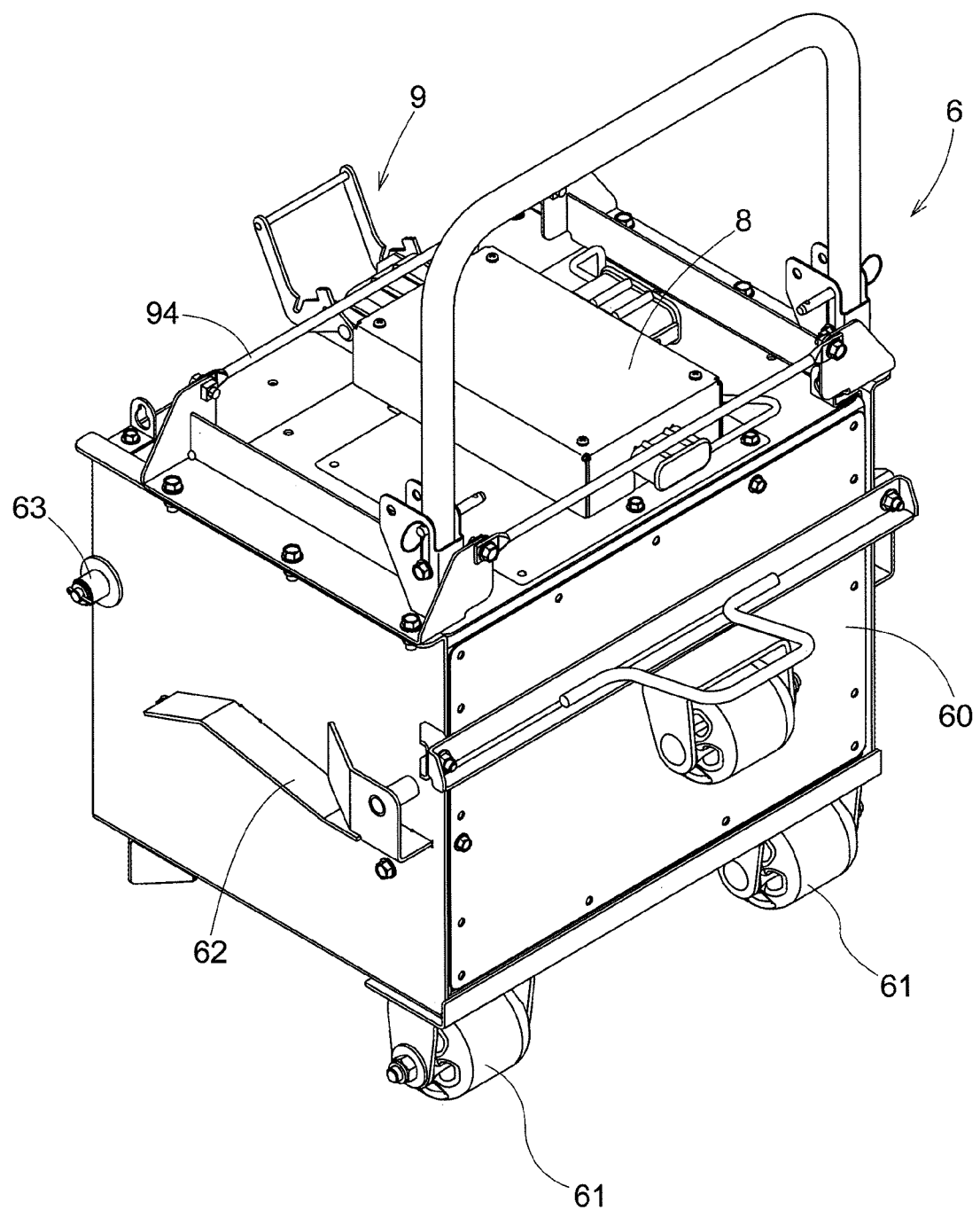
FIG. 3 is a perspective view of a battery device.

A battery device 6 for feeding power to the travel motors 15 and to the cutting blade motor 32 is detachably housed in the battery housing part 4. As shown in FIG. 3, the battery device 6 includes an approximately cubic housing 60 having three rollers 61 on a bottom face thereof. A plurality of battery packs are incorporated in the housing 60. A battery guide rail 62 and a battery guide roller 63 are provided on each of left and right sides of the housing 60. A connector unit 8 for charging and feeding power is provided on a center of an upper face of the housing 60. A connecting operation tool 9 is provided on a front end upper face of the housing 60.

Figure 4:
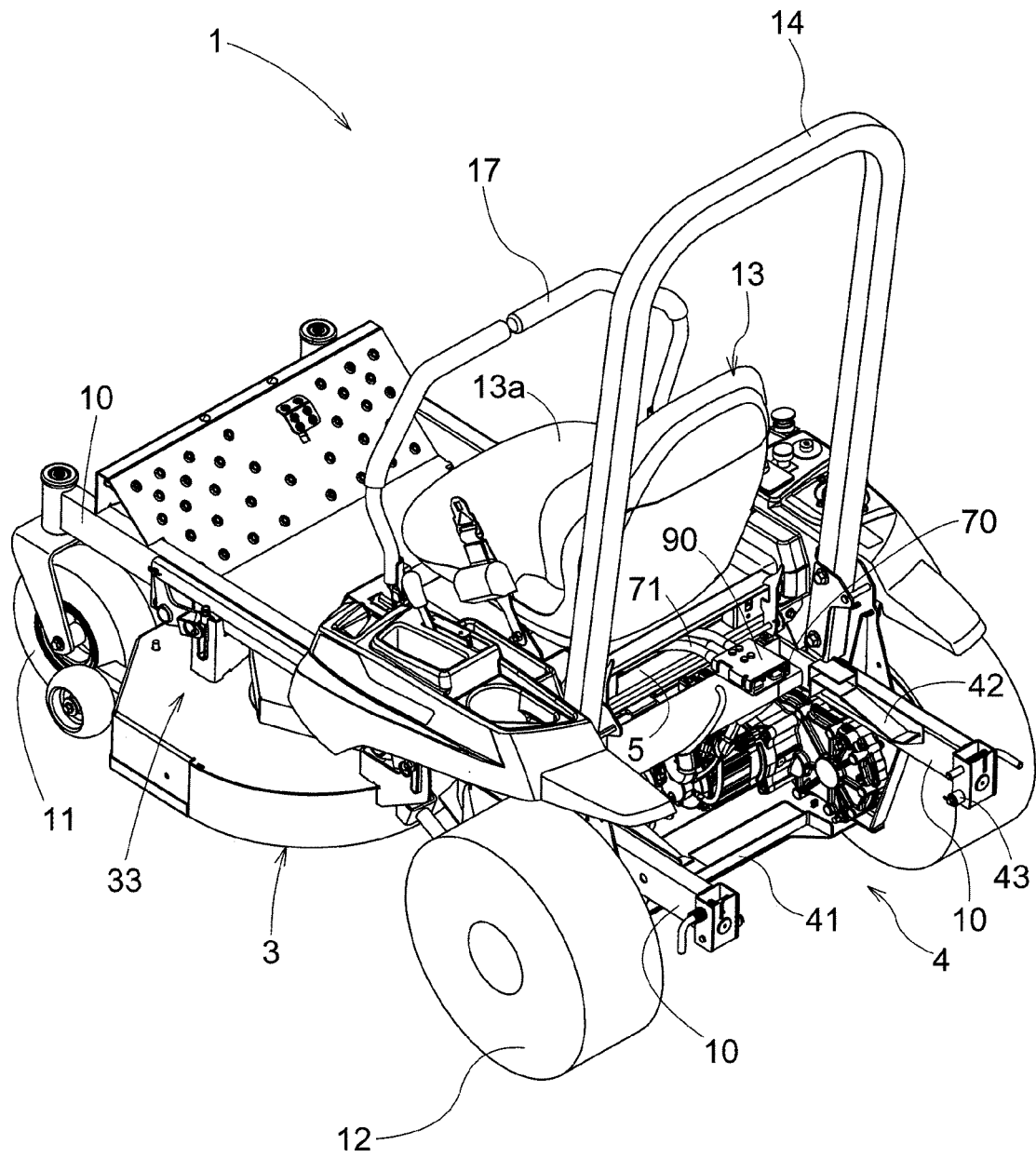
FIG. 4 is a perspective view of an electric work vehicle showing a vicinity of a battery housing part.

As shown in FIG. 4, the battery housing part 4 is formed between rear end parts of the left and right frames 10. A cross member 41 for linking the left and right frames 10 is configured to be used as a mounted stage for the battery housing part 4. Further, a vehicle body guide rail 42 and a vehicle body guide roller 43 are provided on an inner face of the rear end part of each of the left and right frames 10. A cable harness 71 extends out of a power controller unit 5 arranged below the seat cushion 13a of the driver's seat 13, and a free connector 70 is attached to a distal end of the cable harness 71.

When the battery device 6 is loaded in the battery housing part 4, the battery guide rollers 63 are guided along the vehicle body guide rails 42, and the battery guide rails 62 are brought into contact with the vehicle body guide rollers 43. With the above, the battery device 6 is smoothly moved to a housed position in the battery housing part 4.

Figure 5:
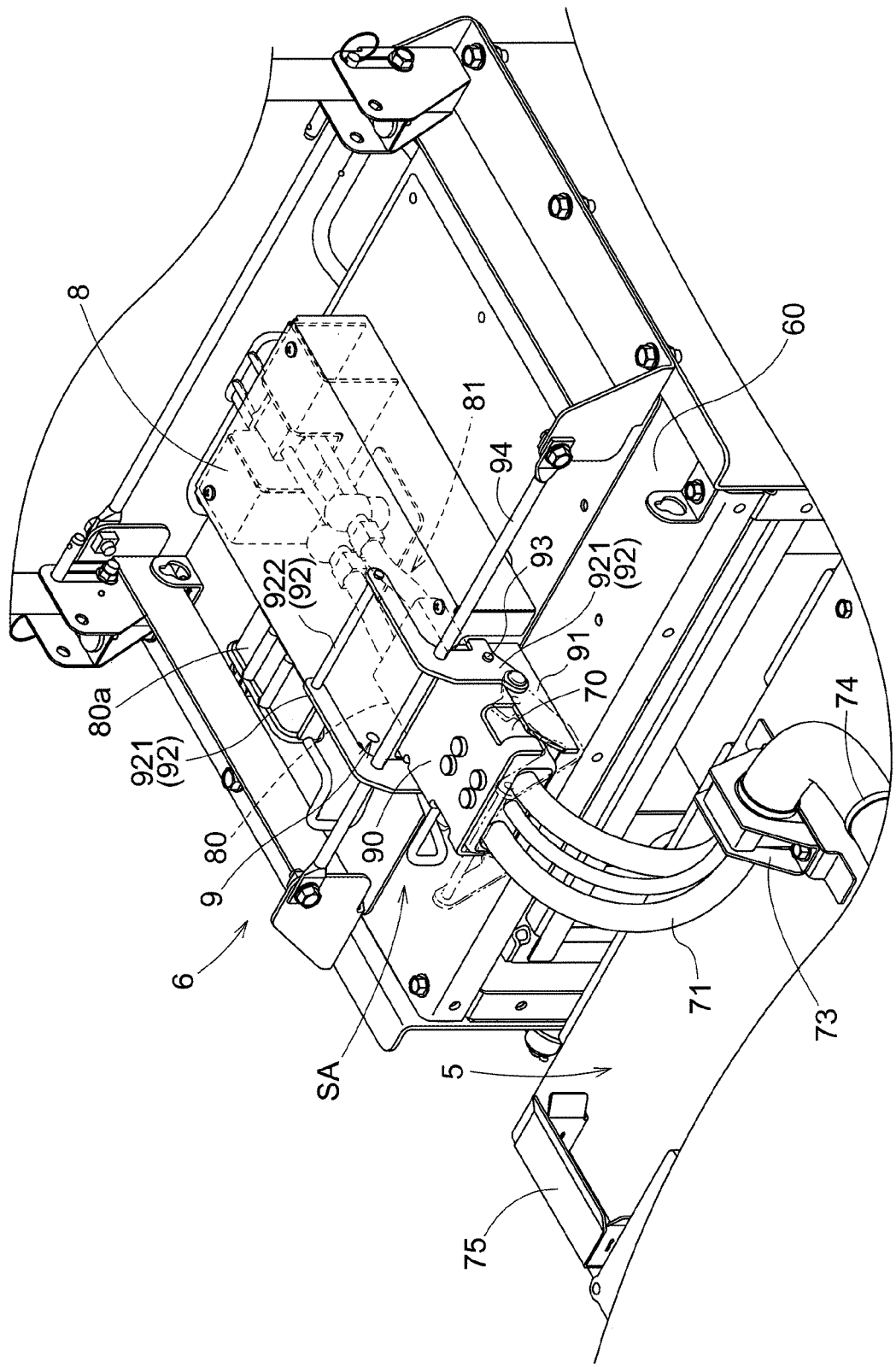
FIG. 5 is a perspective view showing a cable harness, a free connector, and a fixed connector.
Figure 6:
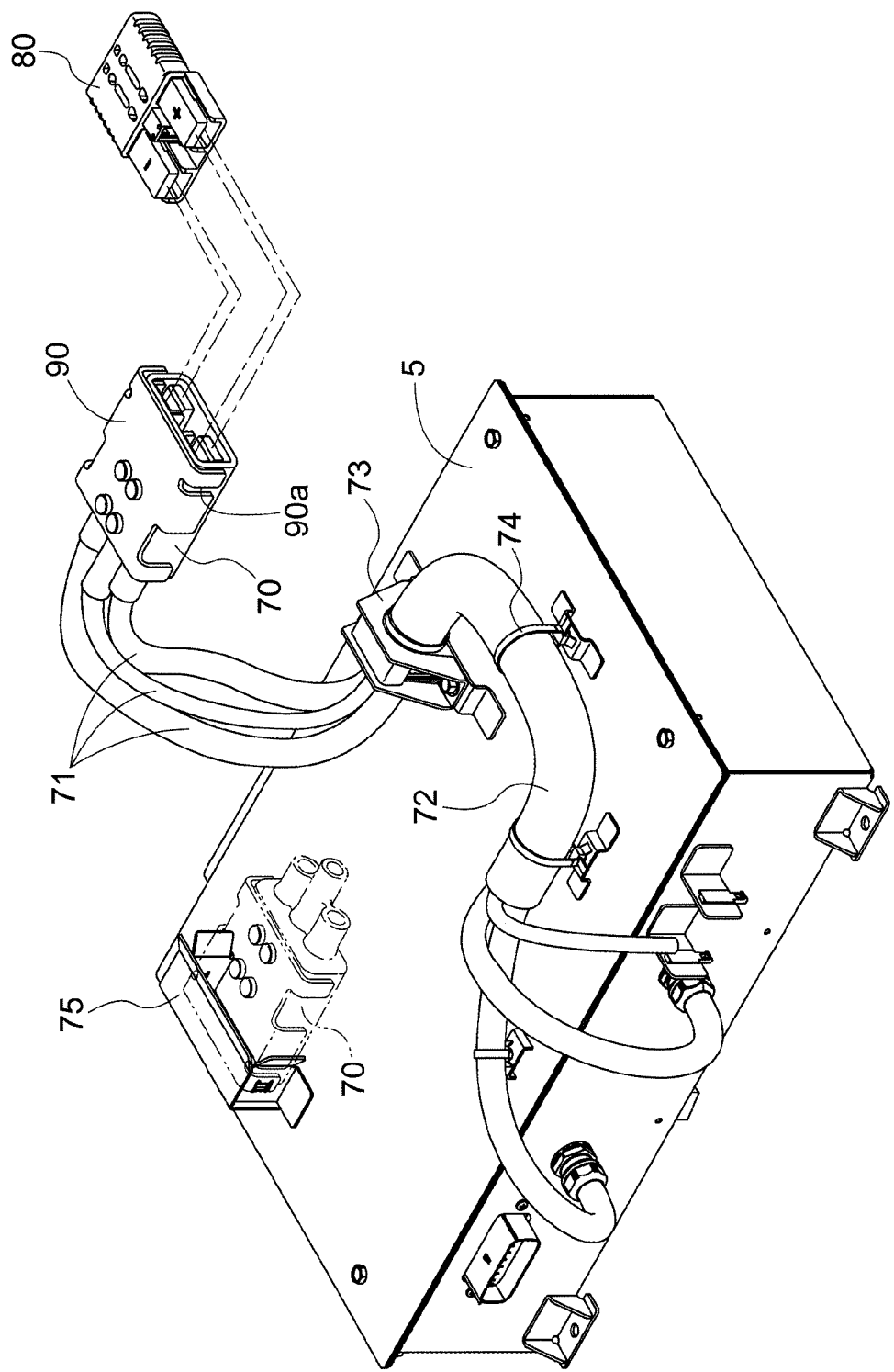
FIG. 6 is a perspective view showing a cable harness and a free connector provided on an upper face of a power controller unit.

FIG. 5 shows a power feeding assembly SA which connects the power controller unit 5 to the battery device 6 housed in the battery housing part 4 so as to feed power. The power feeding assembly SA includes the cable harness 71, the free connector 70, and a fixed connector 80 as shown in FIG. 6. The free connector 70 is provided at an end of the cable harness 71. In this embodiment, a connector bracket 90 is fixed to the free connector 70. The cable harness 71 is a bundle of flexible cables, and a middle part thereof is covered by a holding pipe 72 composed of material with high rigidity. The holding pipe 72 is fixed to an upper face of the power controller unit 5 by a bush mounting 73 and a fastening tool 74, and a middle part of the cable harness 71 is held at a predetermined position. The holding pipe 72, the bush mounting 73, and the fastening tool 74 serve as holding tools for fixing the middle part of the cable harness 71 to the power controller unit 5. Since a section of the cable harness 71 from the middle part to the free connector 70 is left exposed and thus can be bent freely. The free connector 70 which has been detached from the fixed connector 80 can be inserted into a socket 75 provided on the upper face of the power controller unit 5. With the above, the detached free connector 70 is held at a predetermined position on the upper face of the power controller unit 5.

As shown in FIG. 5, the fixed connector 80 is fixed to the upper face of the housing 60 of the battery device 6 as a component of the connector unit 8 together with other connector devices. The fixed connector 80 is connected to a battery cable 81. The battery cable 81 feeds power from battery packs incorporated in the battery device 6 to the fixed connector 80. To the fixed connector 80 which has been detached from the free connector 70, there can be attached a cylindrical rubber connector cover 80a which covers a connection region of the fixed connector 80. Even when the battery device 6 is removed from the vehicle body 1 and is put outside, a connecting part of the free connector 70 is dustproofed and waterproofed by the attached connector cover 80a.

Connection and disengagement between the free connector 70, to which the connector bracket 90 is fitted and fixed, and the fixed connector 80 are conducted by using a connecting operation tool 9. As shown in FIG. 5, the connecting operation tool 9 has an arm base 91 and a gate type lever 92. The arm base 91 is fixed to the upper face of the housing 60 of the battery device 6. The lever 92 is attached to the arm base 91 so as to be pivotally movable around a horizontal axis. The lever 92 includes a pair of right and left lever pieces 921 and a cross rod 922 linking both the lever pieces 921. Pins 93 which protrude inward so as to face each other are provided in base parts of the right and left lever pieces 921.

Figure 7:
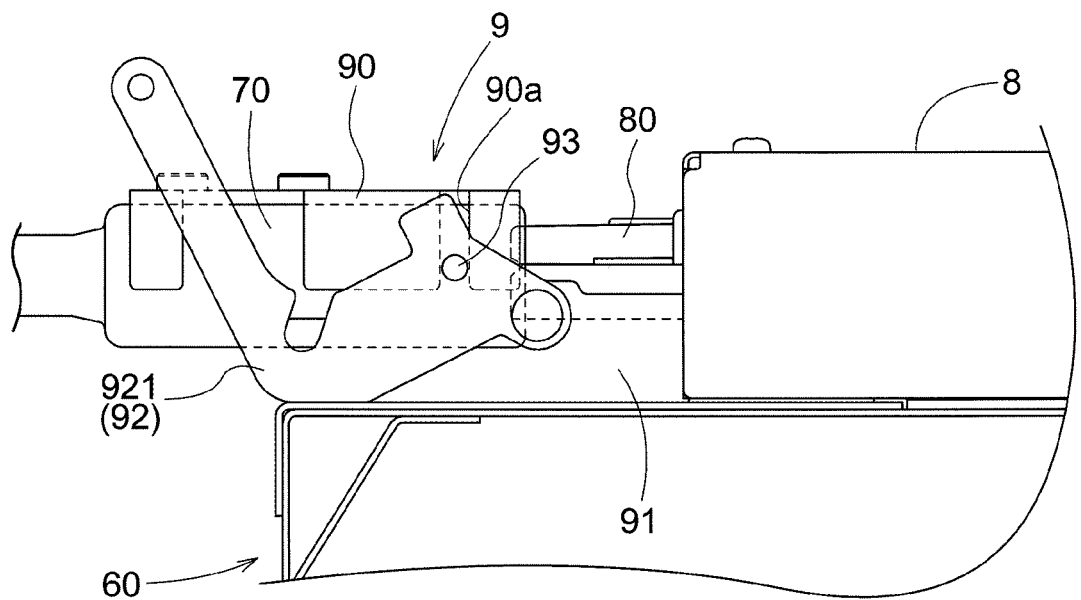
FIG. 7 is a side view showing a posture of a connecting operation tool before connection.
Figure 8:
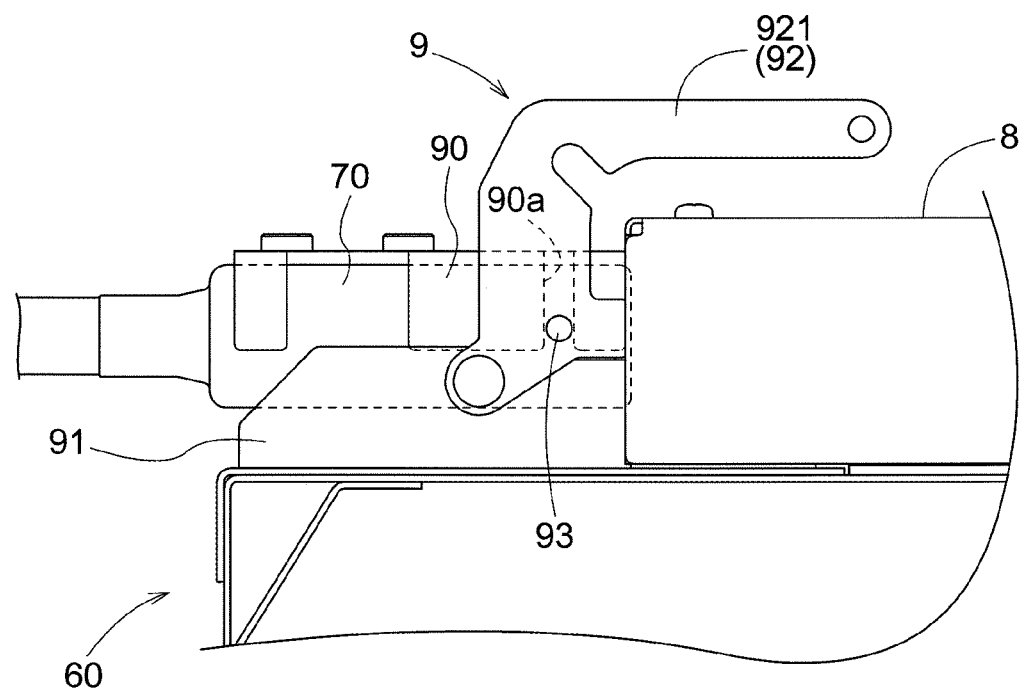
FIG. 8 is a side view showing a posture of the connecting operation tool after connection.

FIG. 7 and FIG. 8 show transition of the power feeding assembly SA from a pre-connecting posture (detaching position) in which the free connector 70 and the fixed connector 80 face each other to a connecting posture (connecting position) in which the free connector 70 is connected to the fixed connector 80. In the pre-connecting posture shown in FIG. 7, the free connector 70 is set to face the fixed connector 80. At such a time, the pins 93 of the connecting operation tool 9 are inserted into respective engagement long holes 90a (grooves 90a) of the connector bracket 90.

By pivotally moving the lever 92 of the connecting operation tool 9 toward a rear side of the vehicle body with this condition, the connector bracket 90 and the free connector 70 are moved toward the rear side of the vehicle body, and the free connector 70 is fitted in the fixed connector 80. In other words, during a movement of the connecting operation tool 9 from the detaching position to the connecting position, the pins 93 push the free connector 70 to the fixed connector 80.

In the connecting posture shown in in FIG. 8, the lever 92 has been pivotally moved to the connecting position, and the free connector 70 is completely connected to the fixed connector 80. As shown in FIG. 5, a lock mechanism for locking the right and left levers 92 which have been pivotally moved to the connecting position is provided although it is omitted in FIG. 8. In this embodiment, the lock mechanism is composed of a lock rod 94 which penetrates through the right and left levers 92 and whose ends are fixed to the battery device 6 via a bracket. As the lock mechanism, various forms can be adopted. For example, a lock mechanism may be adopted, in which the lever 92 is fixed to the arm base 91 by a lock bolt, a lock pin or the like which penetrates through the lever 92 and the arm base 91 at the connecting position. Alternatively, a lock mechanism may be adopted in which an interengaging part is formed at the connecting part of the free connector 70 and the connecting part of the fixed connector 80, and an engagement state of the interengaging part is maintained by a spring or the like when the free connector 70 advances to the connecting position of the fixed connector 80. Further, a toggle-type lock mechanism may be adopted in which, when the lever 92 is pivotally moved to the connecting position, the pivotally moving position is self-maintained by a spring force. When the connecting operation tool 9 is moved to the detaching position, the connection between the fixed connector 80 and the free connector 70 is disengaged. When the connecting operation tool 9 is located at the detaching position, the free connector 70 can be detached from the connecting operation tool 9. In other words, when the connecting operation tool 9 is located at the detaching position, the free connector 70 can be released from the connecting operation tool 9.

The embodiments disclosed in this description are exemplary and the embodiments of the present invention are not limited to them, and it is possible to modify them appropriately within a range not departing from an object of the present invention.

[Other embodiments] (1) In the embodiment described above, the connector bracket 90 is fixed to the free connector 70, and connecting the free connector 70 to the fixed connector 80 is conducted by moving the connector bracket 90 to the fixed connector 80 with the operation of the connecting operation tool 9. Connecting the free connector 70 to the fixed connector 80 may be conducted by forming engagement holes, with which the pins 93 can engage, in the free connector 70 and by directly moving the free connector 70 to the fixed connector 80 with the operation of the connecting operation tool 9.

(2) In the embodiment described above, the holding pipe 72 holding the cable harness 71 is fixed by bush mounting 73 as a fastener. Alternatively, the cable harness 71 can be held by a bracket having a pivotally moving function.

(3) In the embodiment described above, the electric work vehicle is a zero turn type electric mower, but may be other types of electric mowers, or an electric work vehicle such as an agricultural work vehicle and a snow removal vehicle.

INDUSTRIAL APPLICABILITY

The invention can be applicable to all electric vehicles having a detachable battery device.

REFERENCE SIGNS LIST

1: Vehicle body
4: Battery housing part
5: Power controller unit
10: Frame
13: Driver's seat
13a: Seat cushion
13b: Seat back
6: Battery device
60: Housing
70: Free connector
71: Cable harness
72: Holding pipe
73: Bush mounting
74: Fastening tool
75: Socket
80: Fixed connector
81: Battery cable
9: Connecting operation tool
90: Connector bracket
91: Arm base
92: Lever
93: Pin
94: Lock rod
921: Lever piece
922: Cross rod
SA: Power feeding assembly

What is claimed is:

1. An electric work vehicle comprising:
   a battery device which is detachably housed in a battery housing part provided in a vehicle body;
   a power controller unit provided in the vehicle body;
   a power feeding assembly which connects the battery device to the power controller unit so as to feed power; and
   a connecting operation tool attached to the battery device;
   wherein the power feeding assembly comprises a fixed connector which is fixed to the battery device and electrically connected to the battery device, a cable harness which is electrically connected to the power controller unit, and a free connector which is provided at an end of the cable harness and connectable to the fixed connector, and
   the connecting operation tool is configured to be movable between a connecting position in which the free connector is electrically connected to the fixed connector and a detaching position in which the free connector is electrically detached from the fixed connector.

2. The electric work vehicle according to claim 1, wherein the connecting operation tool comprises a pin which pushes the free connector to the fixed connector during a movement from the detaching position to the connecting position.

3. The electric work vehicle according to claim 1, wherein the power controller unit is provided with a socket to which the free connector released from the connecting operation tool at the detaching position is inserted.

4. The electric work vehicle according to claim 3, wherein the power controller unit is provided with a holding tool for fixing a middle part of the cable harness to the power controller unit, and at least a partial section of the cable harness from the middle part to the free connector is flexible.

5. The electric work vehicle according to claim 1, wherein a seat cushion of a driver's seat which is movable forward with a seat back is arranged above the power controller unit, and the free connector, the cable harness and the free connector detached from the connecting operation tool detached from the connecting operation tool are arranged in a space between the seat cushion and an upper face of the power controller unit.

6. The electric work vehicle according to claim 1, wherein the connecting operation tool is provided on a housing of the battery device and the free connector is movable freely within an allowable range constrained by the cable harness.

* * * * *